(12) United States Patent
Mitsuta et al.

(10) Patent No.: US 9,291,709 B2
(45) Date of Patent: Mar. 22, 2016

(54) DUMP TRUCK

(75) Inventors: Shinji Mitsuta, Hiratsuka (JP); Shigeru Harada, Chigasaki (JP); Tomikazu Tanuki, Fujisawa (JP); Eishin Masutani, Hiratsuka (JP); Yukihiro Nakanishi, Hiratsuka (JP); Takeshi Kurihara, Hiratsuka (JP); Dai Tsubone, Hiratsuka (JP); Masaomi Machida, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 326 days.

(21) Appl. No.: 13/811,966

(22) PCT Filed: May 23, 2012

(86) PCT No.: PCT/JP2012/063229
§ 371 (c)(1),
(2), (4) Date: Jan. 24, 2013

(87) PCT Pub. No.: WO2012/169359
PCT Pub. Date: Dec. 13, 2012

(65) Prior Publication Data
US 2013/0169469 A1     Jul. 4, 2013

(30) Foreign Application Priority Data
Jun. 7, 2011 (JP) .................................. 2011-127224

(51) Int. Cl.
*G01S 13/86* (2006.01)
*B60R 1/00* (2006.01)
(Continued)

(52) U.S. Cl.
CPC ................. *G01S 13/867* (2013.01); *B60R 1/00* (2013.01); *G01S 13/931* (2013.01); *G06T 1/0007* (2013.01); *B60R 2300/802* (2013.01)

(58) Field of Classification Search
CPC ... B60R 1/00; B60R 2300/802; G01S 13/867; G01S 13/931; G06T 1/0007
USPC .......................................................... 342/52
See application file for complete search history.

(56) References Cited

U.S. PATENT DOCUMENTS

2004/0051659 A1* 3/2004 Garrison .......................... 342/70
2008/0117098 A1* 5/2008 Johnson et al. ............... 342/25 F
(Continued)

FOREIGN PATENT DOCUMENTS

CN          2721461 Y      8/2005
JP          H03-099952     4/1991
(Continued)

OTHER PUBLICATIONS

Australian Patent Examination Report, issued on Sep. 16, 2013 for the corresponding Australian application No. 2012268483.
(Continued)

*Primary Examiner* — Timothy A Brainard
(74) *Attorney, Agent, or Firm* — Global IP Counselors, LLP

(57) ABSTRACT

A dump truck includes a body and a plurality of cameras. The body includes an upper deck and a main frame disposed in a longitudinal direction. The cameras are configured and arranged to obtain images to be combined to generate a bird's-eye image to monitor a periphery of the dump truck. The cameras include a front camera, a rear camera and side cameras. The front camera is disposed at the front of the upper deck to obtain an image of an area in front of the body. The rear camera is disposed at a rear end of the main frame to obtain an image of an area in rear of the body. The side cameras are respectively provided on left and right sides of the upper deck to obtain images of an area between diagonally to the front and diagonally to the rear of the body.

7 Claims, 16 Drawing Sheets

(51) Int. Cl.
*G01S 13/93* (2006.01)
*G06T 1/00* (2006.01)

(56) References Cited

U.S. PATENT DOCUMENTS

| | | | |
|---|---|---|---|
| 2009/0259400 A1 | 10/2009 | Coats et al. | |
| 2010/0092042 A1* | 4/2010 | Asari | B60R 1/00 382/106 |

FOREIGN PATENT DOCUMENTS

| | | |
|---|---|---|
| JP | 09-125466 | 5/1997 |
| JP | 10-59068 A | 3/1998 |
| JP | 11-255018 A | 9/1999 |
| JP | 2001-114048 | 4/2001 |
| JP | 2001-339715 | 7/2001 |
| JP | 2009-121053 | 6/2009 |
| JP | 2009-217740 | 9/2009 |
| JP | 2010-093605 | 4/2010 |
| JP | 2011-011620 | 1/2011 |
| JP | 2011-028634 | 2/2011 |
| JP | 2011-71932 A | 4/2011 |

OTHER PUBLICATIONS

The Chinese Office Action for the corresponding Chinese application No. 201280002190.X, issued on Aug. 1, 2014.
The International Search Report for the corresponding international application No. PCT/JP2012/063229, issued on Aug. 28, 2012.
International Search Report of corresponding PCT Application No. PCT/JP2012/063229.
The Office Action for the corresponding Japanese application No. 2014-178443, issued on Apr. 23, 2015.
Office Action for the corresponding Japanese patent application No. 2014-178443, issued on Jan. 5, 2016.

* cited by examiner

DUMP TRUCK

CROSS-REFERENCE TO RELATED APPLICATIONS

This application claims priority to Japanese Patent Application No. 2011-127224 filed on Jun. 7, 2011, the disclosure of which is hereby incorporated herein by reference in its entirety.

BACKGROUND OF THE INVENTION

1. Field of the Invention

The present invention relates to a dump truck whose periphery is monitored using a bird's-eye image obtained by combining a plurality of images captured by a plurality of cameras installed on the deck and elsewhere.

2. Description of the Related Art

The dump trucks used in mining and other such work have a vehicle width (such as about 5 m) that is markedly larger than that of ordinary trucks and buses. Since the cab in which the driver sits is provided to the left on the deck at the front of the body, the driver is able to visually check only the portion on the left-front side.

Accordingly, dump trucks are equipped with a plurality of cameras on the deck where the cab is located and at other locations, and these cameras are used to monitor the periphery around the body.

Japanese Laid-Open Patent Application H3-99952, for example, discloses a periphery monitoring device with which images from cameras installed on a vehicle are converted into perspective images, and these are combined into a single image in relation to an image of the vehicle, thus allowing the driver to easily recognize the relative positional relation between his vehicle and any obstacles or the like around the vehicle.

SUMMARY

However, the following problems were encountered with the above-mentioned conventional periphery monitoring device.

Specifically, the periphery monitoring device disclosed in the above-mentioned publication was intended for use in monitoring the periphery when an automobile is being put into a garage, for example, making it difficult to adapt directly to a dump truck.

More specifically, with a dump truck, unlike with an automobile, the periphery has to be monitored over a wider range because of the limited visibility from the driver's seat, and a plurality of cameras need to be installed at suitable locations so that there are no dead angles. With a dump truck, however, there are limitations imposed by the vehicle shape and so forth, so these limitations need to be taken into account while optimizing the camera layout so as to cover a wide range of periphery monitoring.

It is an object of the present invention to provide a dump truck with which it is possible to perform periphery monitoring with no dead angles, by optimizing the layout of a plurality of cameras while taking into account limitations such as the shape of the dump truck.

The dump truck pertaining to the first aspect is a dump truck in which a plurality of cameras are installed and which monitors the periphery by using a bird's-eye image that combines images obtained by the plurality of cameras, said dump truck comprising a body, a front camera, a rear camera, and side cameras. The body includes an upper deck where a driver's seat is disposed and a main frame disposed in the longitudinal direction. The front camera is disposed at the front of the upper deck so that the area ahead of the body can be imaged. The rear camera is disposed at the rear end of the main frame so that the area to the rear of the body can be imaged. The side cameras are provided on the left and right sides of the upper deck so that the area between diagonally to the front and diagonally to the rear can be imaged.

Here, the front camera and the left and right side cameras are installed on the upper deck, and the rear camera is installed at the rear end of the main frame. The left and right side cameras are installed so as to obtain a capture range extending from the lateral front to the lateral rear of the body of the dump truck.

In general, a dump truck is far larger than an automobile, having a vehicle width of at least 5 m, for example, so the range around the outer periphery of the body that can be visually checked from the driver's seat is extremely small. Accordingly, a plurality of cameras are provided to the body, and the driver checks for obstacles or people around the vehicle by looking at a monitor screen or the like provided inside the cab.

With the dump truck of the aspect described above, in installing the plurality of cameras, the front camera is installed on the upper deck (which is part of the body), the side cameras are provided on the left and right sides, and the rear camera is provided to the rear end of the main frame, avoiding the area to the rear on the right side of the body that can reach high temperatures due to exhaust gas, and avoiding the vessel, which is exchanged to suit the job at hand.

Consequently, the cameras can be disposed properly, so that substantially the entire periphery, from the front, to the left and right sides, to the rear, can be covered while also taking into account the limitations on camera installation sites that are unique to a dump truck. As a result, periphery monitoring that is free of dead angles can be performed by optimizing the layout of the cameras on the dump truck.

The dump truck pertaining to the second aspect is the dump truck pertaining to the first aspect, wherein the front camera, the rear camera, and the side cameras are disposed on the body so as to have a view height that is at least one-half the height of the upper deck in the entire imaging region of adjacent cameras at the boundary portions of bird's-eye images obtained by combining images captured by adjacent cameras.

Here, the cameras are disposed so that one adjacent camera will have a field range of at least one-half the height of the upper deck in the height direction, in order that a person who is near the dump truck will be captured within the imaging region of the cameras and reliably displayed on a bird's-eye image.

The "height of the upper deck" here is assumed to be, for example, at least 4 m from the ground, and one-half this height means, for example, a range of at least 2.0 m.

Usually, with a large vehicle such as a dump truck, the portion below the upper deck, where the cab is installed, is hard to see from the driver's seat inside the cab.

Consequently, if the cameras are installed so as to include a height of at least one-half the height of the upper deck as the field range in the height direction, any people or other obstacles that are lower than a position at one-half the height of the upper deck, which is particularly hard to see from the cab, can be reliably detected. Also, if a person (height of 1.5 to 2 m) is near the dump truck, no matter where the person moves, it is possible to avoid displaying just the upper or lower half of his body, which means that the person's entire body can be displayed on the bird's-eye image. As a result, the periphery monitoring in which the bird's-eye image is used will be more reliable.

The dump truck pertaining to the third aspect is the dump truck pertaining to the first or second aspect, wherein the side cameras have a first camera for imaging the area diagonally to the front of the body, and a second camera for imaging the area diagonally to the rear of the body.

Here, a first camera for imaging the area diagonally to the front of the body, and a second camera for imaging the area diagonally to the rear of the body, are provided on the upper deck as side cameras that image the areas to the sides of the dump truck.

Consequently, together with the front camera and rear camera, these cameras can display the entire periphery around the dump truck on a bird's-eye image with as little distortion as possible. Thus, it is easier for the driver to check for obstacles present in the periphery of the dump truck, and this improves safety.

The dump truck pertaining to the fourth aspect is the dump truck pertaining to any of the first to third aspects, further comprising a plurality of radars that are provided to the body and detect objects present anywhere in the periphery of the body.

Here, in addition to the above-mentioned plurality of cameras, a plurality of radars are provided for detecting obstacles present anywhere in the periphery of the dump truck.

Consequently, the driver can check the bird's-eye image, which is a combination of images captured by the plurality of cameras, from inside the cab while using the radars, which cover the entire periphery, to perform obstacle detection. Thus, even if an obstacle that is hard to confirm in the bird's-eye image should be present somewhere in the periphery of the dump truck, the driver can still reliably recognize the presence of the obstacle.

The dump truck pertaining to the fifth aspect is the dump truck pertaining to the fourth aspect, wherein the plurality of radars are provided at positions lower than those of the plurality of cameras on the body.

Here, the radars used to detect obstacles present in the periphery of the dump truck are provided at positions lower than the positions where the above-mentioned plurality of cameras used for periphery monitoring are installed.

Since an obstacle detected by radar is usually present on the ground, and almost never in the air, in obstacle detection by radar it is not necessary to dispose the radars so that they are looking down from above, as with the above-mentioned cameras. Consequently, an obstacle present on the ground and in the periphery of the dump truck can be detected accurately from far away.

The dump truck pertaining to the sixth aspect is the dump truck pertaining to the fourth or fifth aspect, wherein the plurality of radars are provided between the upper deck and a lower deck, which constitute part of the body, or on the lower deck.

Here, the plurality of radars are provided on the lower deck around the outer periphery of the vehicle, or between the lower deck and the upper deck.

Consequently, the radars can be provided at positions on the dump truck that are relatively close to the ground, so obstacles present on the ground can be detected more accurately.

The dump truck pertaining to the seventh aspect is the dump truck pertaining to any of the fourth to sixth aspects, wherein the plurality of radars are ultra-wideband radars.

Here, ultra-wideband (UWB) radar, which has a wide detection angle and high resolution, allows the measurement of the relative speed of a measurement object, and does not interfere with other devices, is used as the above-mentioned radar for detecting obstacles anywhere in the periphery.

Consequently, even if only a few radars are installed, obstacles present anywhere in the periphery of the dump truck can be accurately detected.

DETAILED DESCRIPTION OF THE INVENTION

The dump truck pertaining to an embodiment of the present invention will now be described through reference to FIGS. 1 to 16c.

In the following description, "front," "rear," "left," and "right" refer to directions based on the direction seen by the driver when seated in the cab and facing forward. The "vehicle width direction" is defined the same as the "left and right direction."

Overall Configuration of Dump Truck 1

The dump truck 1 pertaining to this embodiment is a self-propelled, oversize work vehicle used in mining and other such work, and has a width of about 5 meters or more.

Figure 1:
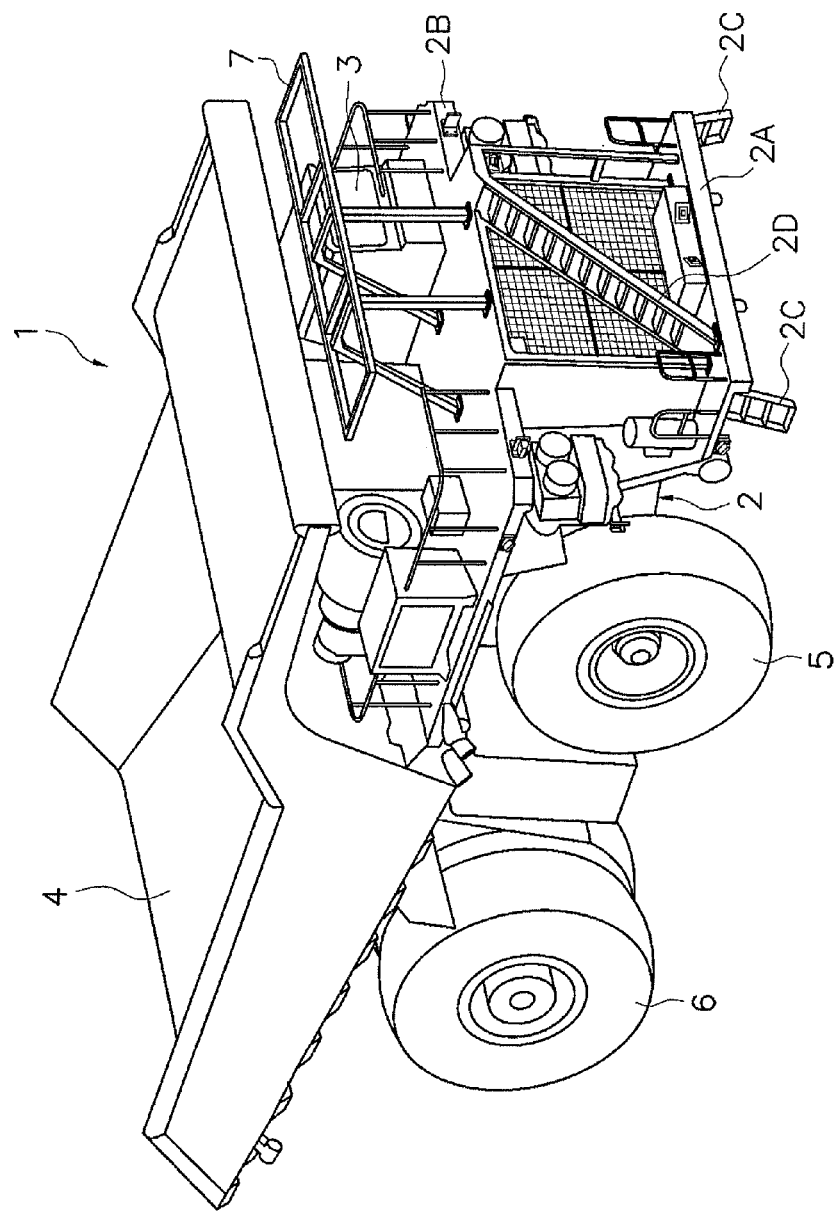
FIG. 1 is an oblique view of the overall configuration of the dump truck pertaining to an embodiment of the present invention.
Figure 3:
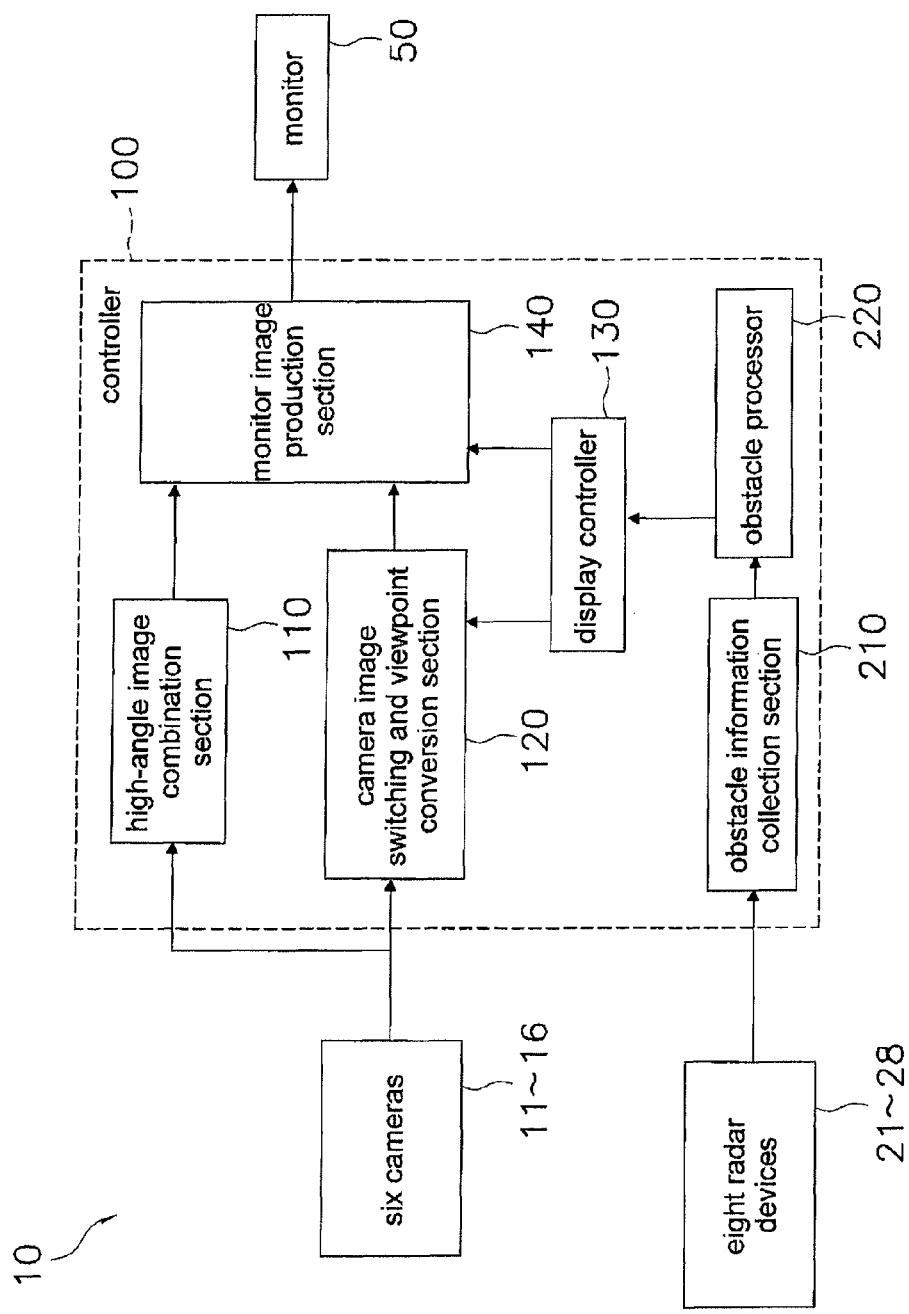
FIG. 3 is a control block diagram of the dump truck in FIG. 1.

As shown in FIG. 1, the dump truck 1 mainly comprises a body frame (main frame) 2, a cab 3, a vessel 4, right and left pairs of front wheels 5 and rear wheels 6, a base 7 on which is installed a pantograph for supplying power (not shown), and a periphery monitoring device 10 for monitoring the vehicle periphery (see FIG. 3). The configuration and operation of the periphery monitoring device 10 will be discussed in detail below.

The body frame 2 supports a diesel engine, a transmission, and other such drive mechanisms, as well as accessory devices (not shown). The left and right front wheels 5 of the 2 are supported at the front part of the body frame 2, and the left and right rear wheels 6 at the rear part. The body frame 2 has a lower deck 2A provided on the side nearest the ground, and an upper deck 2B provided above the lower deck 2A.

Two movable access ladders 2C are provided between the lower deck 2A and the ground. Also, a sloped ladder 2D for going and coming to and from the lower deck 2A and the upper deck 2B is provided between the lower deck 2A and the upper deck 2B. A fence-like handrail is fixed on the upper deck 2B to allow movement around the outer peripheral part of the upper deck 2B. With the dump truck 1 in this embodiment, the ladders 2C and 2D shall be considered a part of the upper deck 2B and the lower deck 2A.

Figure 2:
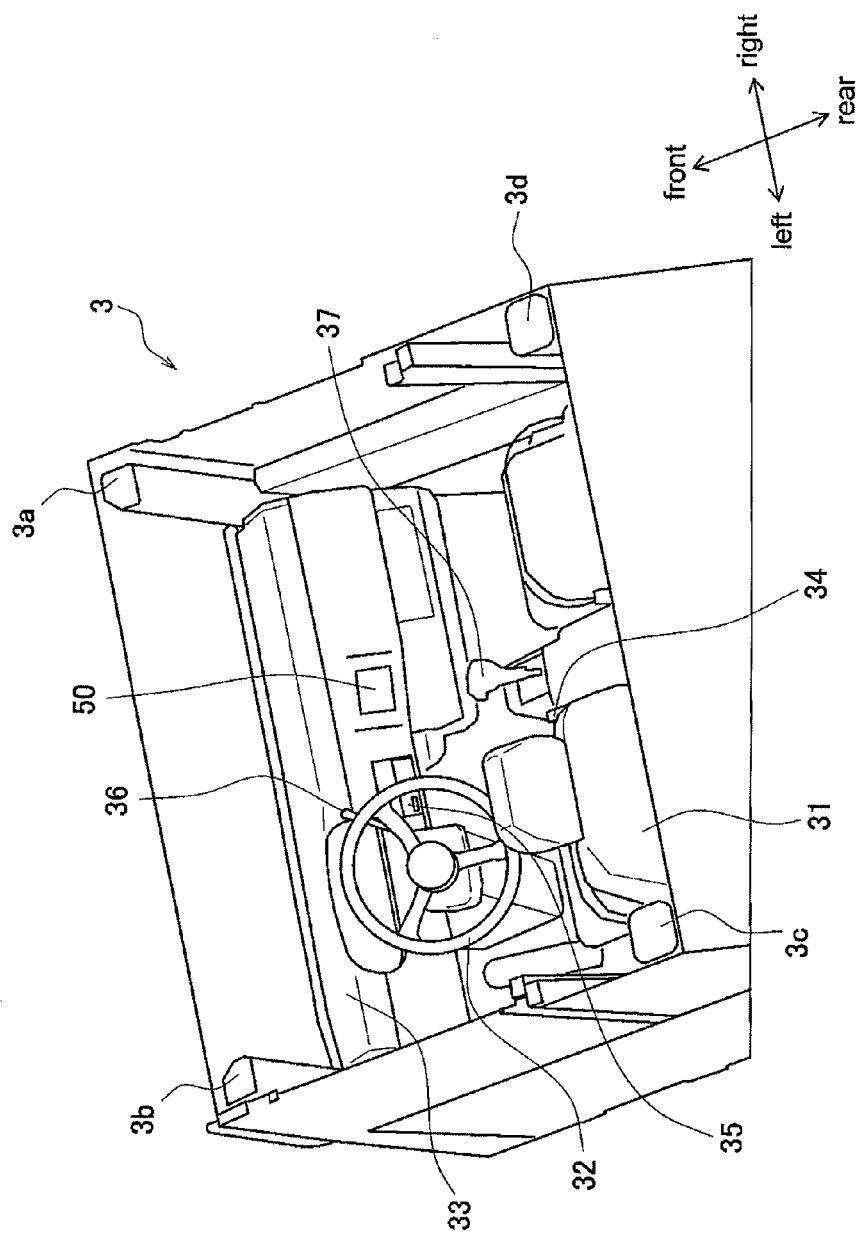
FIG. 2 is an oblique view of the configuration inside the cab of the dump truck in FIG. 1.

The cab 3 is disposed to the left of center in the width direction on the upper deck 2B, and as shown in FIG. 2, has an ROPS (roll-over protection structure) made up of four support bars 3a, 3b, 3c, and 3d. The driver is able to easily check the road shoulder on the left side of the vehicle while driving, but has to move his head considerably in order to check around the periphery of the vehicle. The upper deck 2B is also provided with a plurality of side mirrors (not shown) for checking the periphery of the vehicle. Since these side mirrors are located away from the cab 3, the driver also has to move his head considerably when using the side mirrors to check the periphery.

As shown in FIG. 2, inside the cab 3 are provided a driver seat 31, a steering wheel 32, a dashboard 33, a wireless device 34, a radio receiver 35, a retarder 36, a shift lever 37, a controller 100, a monitor 50, an accelerator pedal, a brake pedal, and so forth. The controller 100 and the monitor 50 constitute part of the periphery monitoring device 10 (discussed below).

The vessel 4 is a cargo bed for loading gravel or other heavy materials, and is rotatably linked to the rear end of the body frame 2 via a rotation shaft 4a at the rear bottom part. This allows the front part of the vessel 4 to be rotated upward by a hydraulic cylinder or other such actuator into an erect orientation in which the loaded material is dumped, or, as shown in FIG. 1, to be rotated downward into a loaded orientation in which the front part is located over the cab 3.

Configuration of Periphery Monitoring Device 10

As shown in FIG. 3, the periphery monitoring device 10 has six cameras 11 to 16, eight radar devices 21 to 28, the monitor 50, and the controller 100.

Cameras 11 to 16

Figure 4:
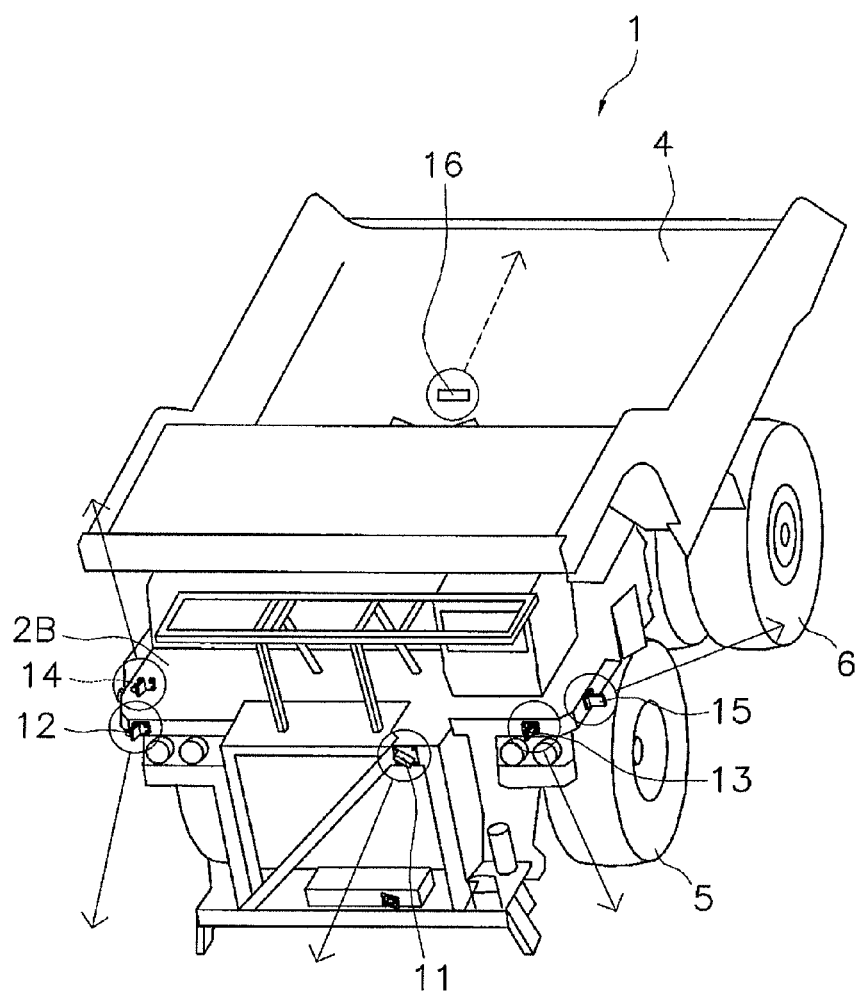
FIG. 4 is an oblique view of the positions of the plurality of cameras installed on the dump truck in FIG. 1.

As shown in FIG. 4, the six cameras 11 to 16 are attached around the outer peripheral part of the dump truck 1 in order to acquire images over a 360-degree range of the periphery of the dump truck 1. The cameras 11 to 16 have a field range of 120 degrees in the left and right direction (60 degrees each to the left and right) and 96 degrees in the height direction.

Figure 5:
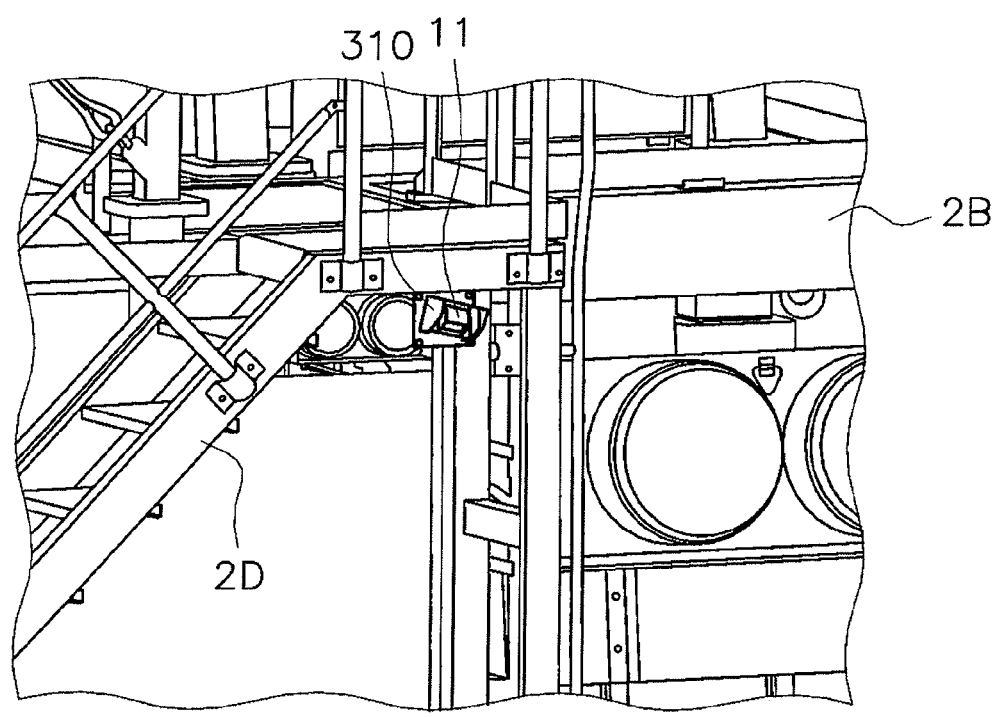
FIG. 5 is an oblique view of the position of the front camera out of the plurality of cameras in FIG. 3.

As shown in FIG. 5, the front camera 11 is disposed at the lower part of the landing at the top step of the sloped ladder 2D, and is fixed facing forward from the vehicle body via a bracket 310 attached to the upper deck 2B. The capture range of the front camera 11 is a first capture range 11C that spreads out in front of the vehicle, in the ground-based capture area shown in FIG. 11.

Figure 6:
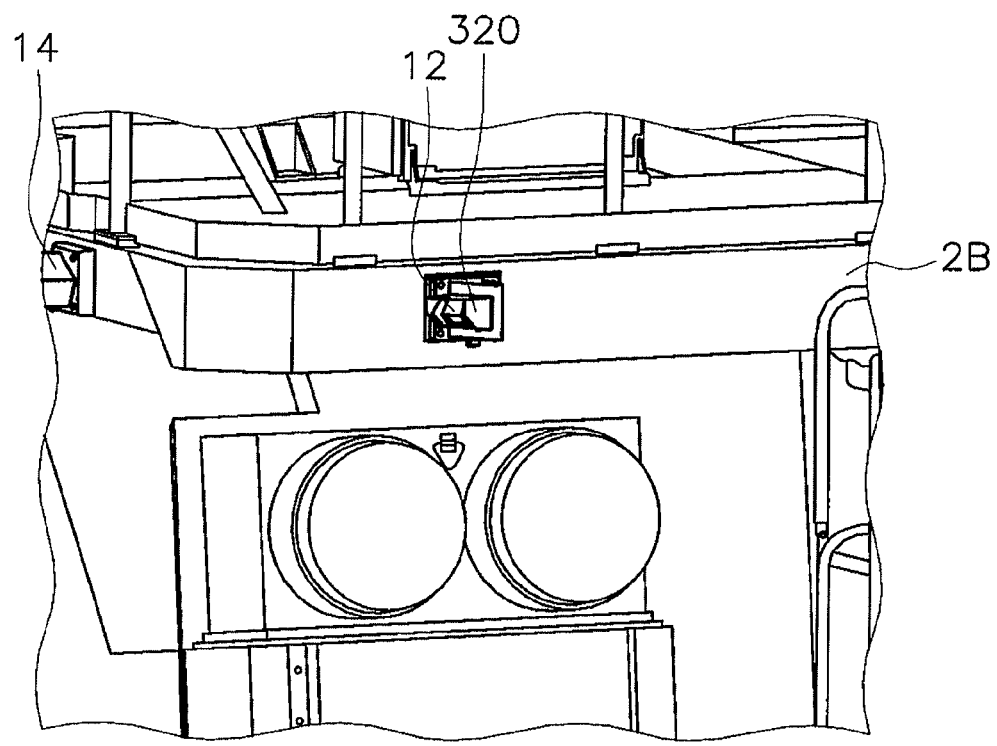
FIG. 6 is an oblique view of the position of the first right-side camera out of the plurality of cameras in FIG. 3.

As shown in FIG. 6, the first right-side camera 12 is disposed near the right end of the front face of the upper deck 2B, and is fixed facing diagonally in the right-front direction from the vehicle body via a bracket 320 attached to the upper deck 2B. The capture range of the first right-side camera 12 is a second capture range 12C that spreads out diagonally to the right-front of the vehicle, in the ground-based capture area shown in FIG. 11.

Figure 7:
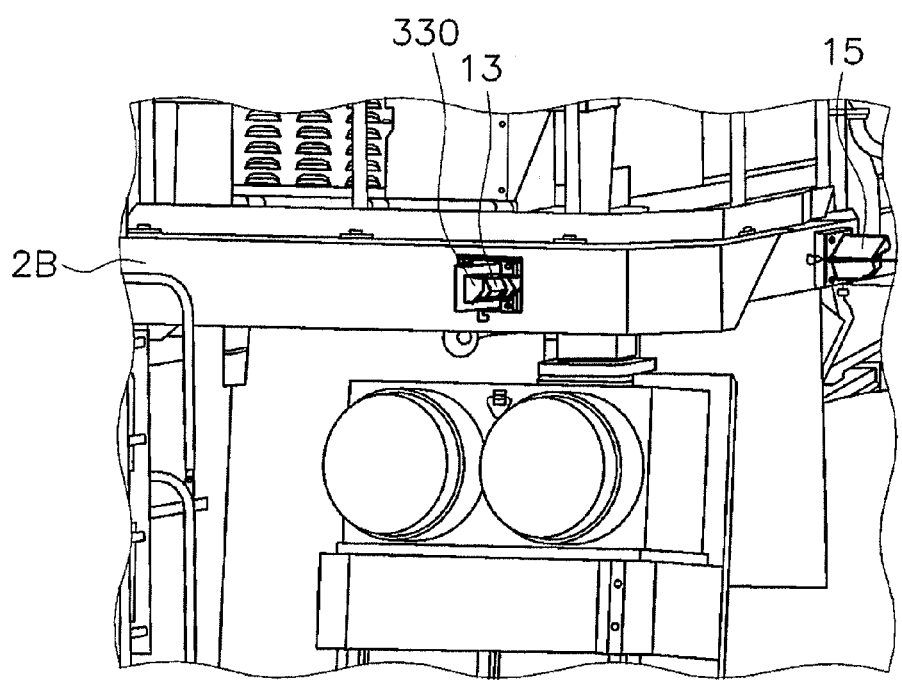
FIG. 7 is an oblique view of the position of the first left-side camera out of the plurality of cameras in FIG. 3.

As shown in FIG. 7, the first left-side camera 13 is disposed in left-right symmetry with the first right-side camera 12, that is, near the left end of the front face of the upper deck 2B, and is fixed facing diagonally in the left-front direction from the vehicle body via a bracket 330 attached to the upper deck 2B. The capture range of the first left-side camera 13 is a third capture range 13C that spreads out diagonally to the left-front of the vehicle, in the ground-based capture area shown in FIG. 11.

Figure 8:
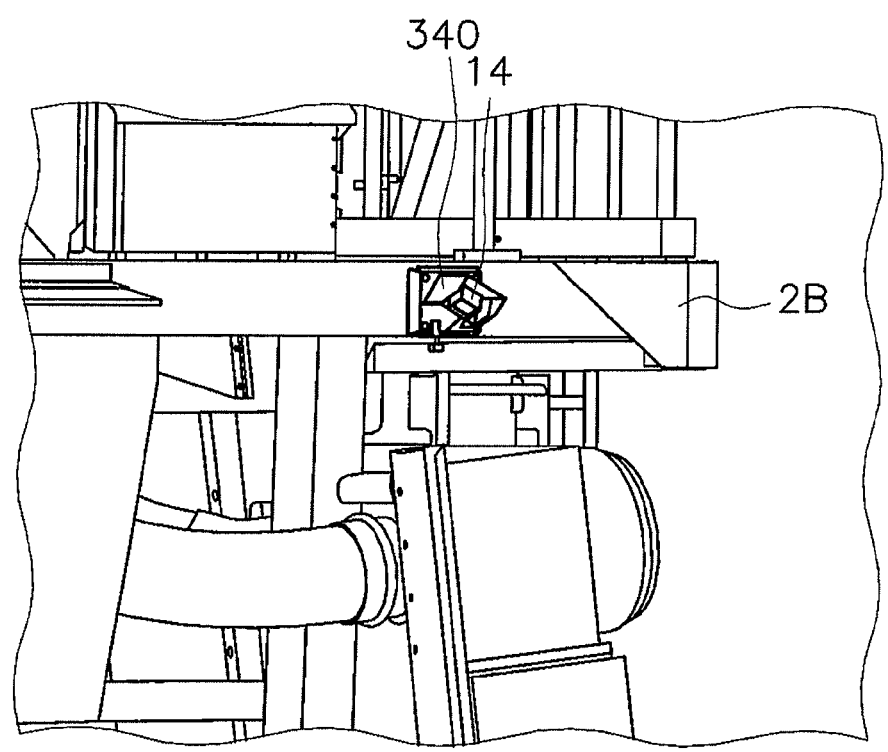
FIG. 8 is an oblique view of the position of the second right-side camera out of the plurality of cameras in FIG. 3.

As shown in FIG. 8, the second right-side camera 14 is disposed near the front end of the right side face of the upper deck 2B, and is fixed facing diagonally in the right-rear direction from the vehicle body via a bracket 340 attached to the upper deck 2B. The capture range of the second right-side camera 14 is a fourth capture range 14C that spreads out diagonally to the right-rear of the vehicle, in the ground-based capture area shown in FIG. 11.

Figure 9:
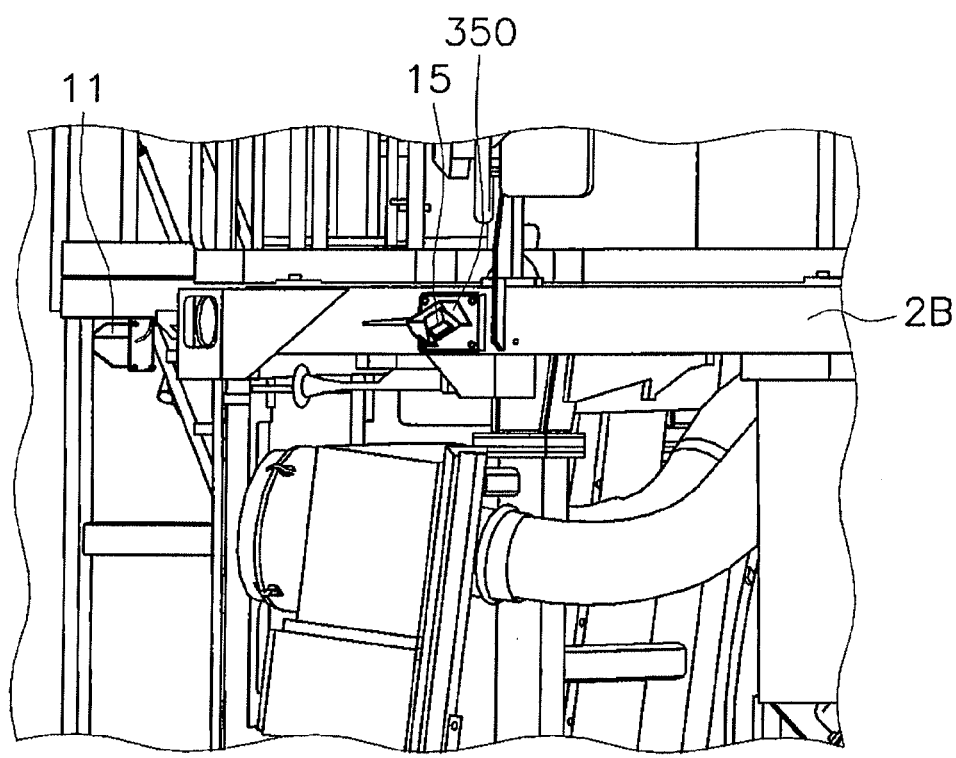
FIG. 9 is an oblique view of the position of the second left-side camera out of the plurality of cameras in FIG. 3.

As shown in FIG. 9, the second left-side camera 15 is disposed in left-right symmetry with a fourth camera, that is, near the front end of the left side face of the upper deck 2B, and is fixed facing diagonally in the left-rear direction from the vehicle body via a bracket 350 attached to the upper deck 2B. The capture range of the second left-side camera 15 is a fifth capture range 15C that spreads out diagonally to the left-rear of the vehicle, in the ground-based capture area shown in FIG. 11.

Figure 10:
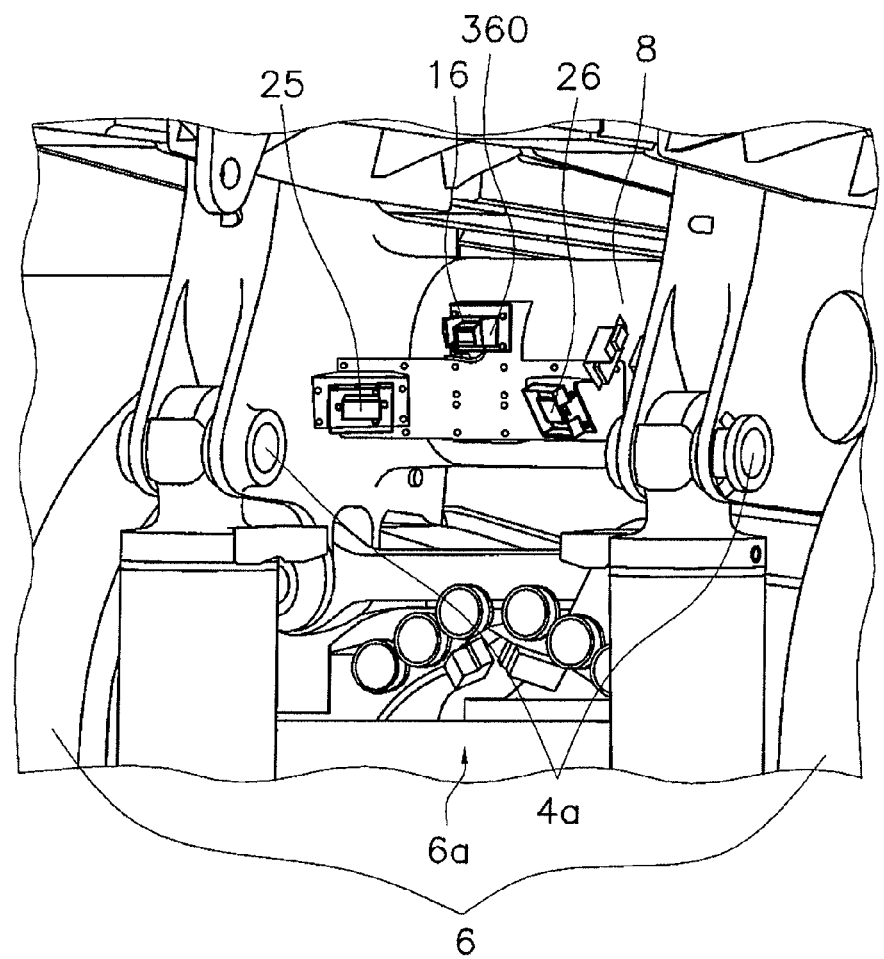
FIG. 10 is an oblique view of the position of the rear camera out of the plurality of cameras in FIG. 3.

As shown in FIG. 10, the rear camera 16 is disposed at the rear end of the body frame 2, above an axle 6a that links the two rear wheels 6, and near the rotation shaft 4a of the vessel 4, and is fixed facing to the rear of the vehicle via a bracket 360 attached to a crossbar 8. The capture range of the rear camera 16 is a sixth capture range 16C that spreads out to the rear of the vehicle, in the ground-based capture area shown in FIG. 11.

Figure 11:
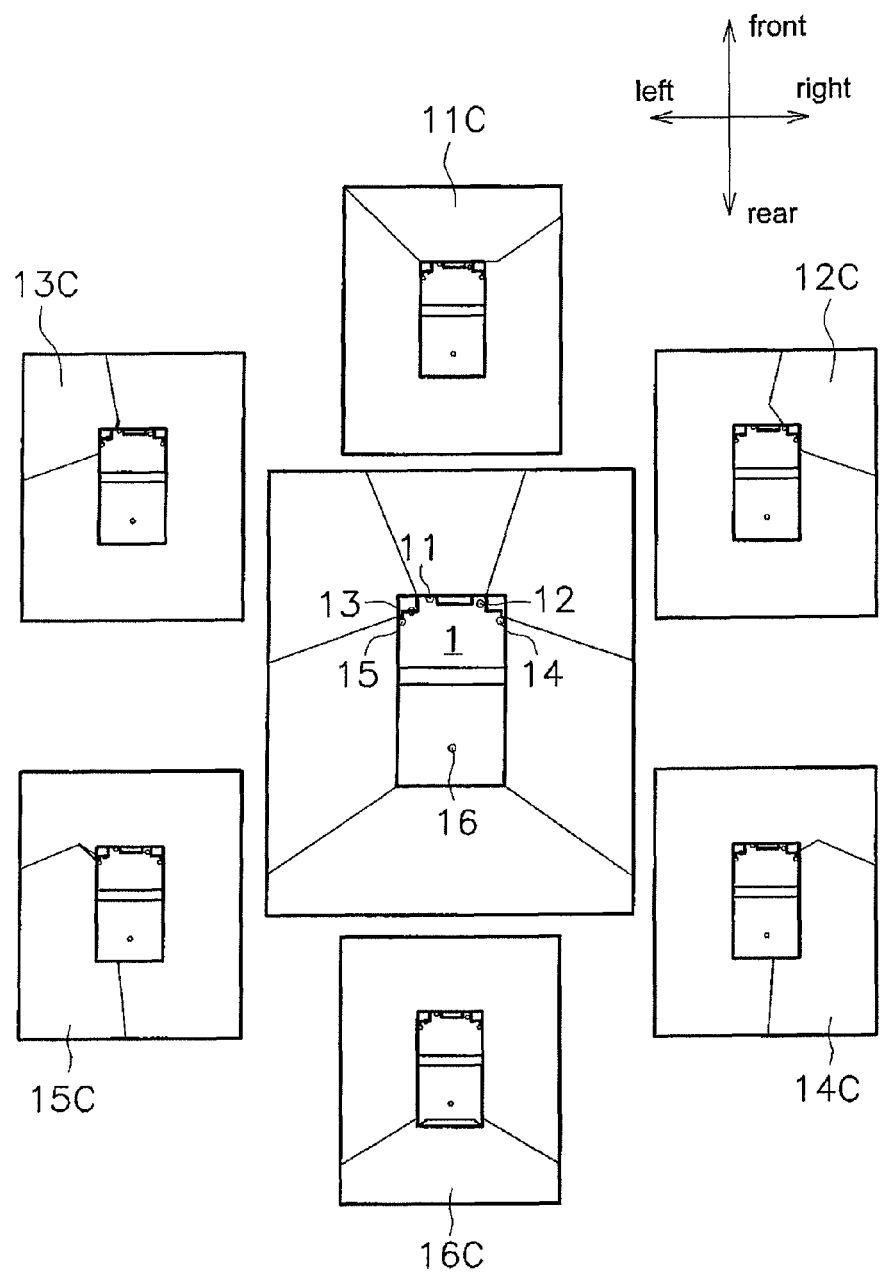
FIG. 11 is a plan view of the imaging area, using as a reference the ground imaged by the plurality of cameras in FIG. 3.

As shown in the middle view in FIG. 11, the above-mentioned six cameras 11 to 16 make it possible to acquire an image all the way around the 360-degree periphery of the dump truck 1. Also, the six cameras 11 to 16 transmit image data corresponding to their respective captured images to the controller 100.

Also, the front camera 11, the first left- and right-side cameras 12 and 13, and the second left- and right-side cameras 14 and 15 are provided to the upper deck 2B at relatively high positions. Therefore, a captured image that looks down at the ground from above can be obtained from the cameras 11 to 15, and people and other obstacles present on the ground can be imaged over a wider range. Also, since images captured from above are used even when performing viewpoint conversion in the formation of a bird's-eye image 200, distortion of three-dimensional objects can be kept to a minimum.

The capture ranges of the cameras 11 to 16 will be discussed in detail at a later point.

Eight Radar Devices 21 to 28

The eight radar devices 21 to 28 are UWB (ultra-wide band) radars that have an orientation of ±40 degrees (80 degrees left and right) and a maximum detection distance of at least 15 m, and detect the relative position of an obstacle present in the periphery of the dump truck 1. The eight radar devices 21 to 28 are mounted to the outer peripheral portion of the dump truck 1, just as the above-mentioned six cameras 11 to 16 are.

Figure 12:
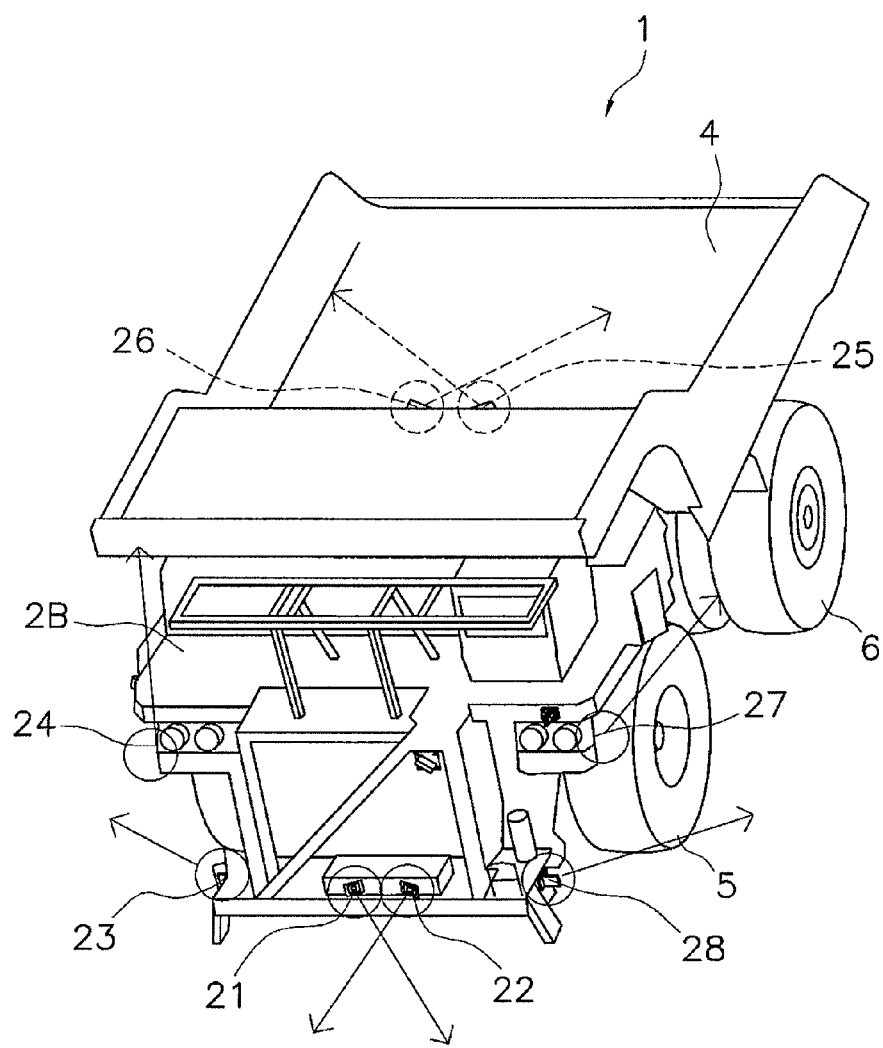
FIG. 12 is an oblique view of the positions of the plurality of radar devices installed on the dump truck in FIG. 1.
Figure 13:
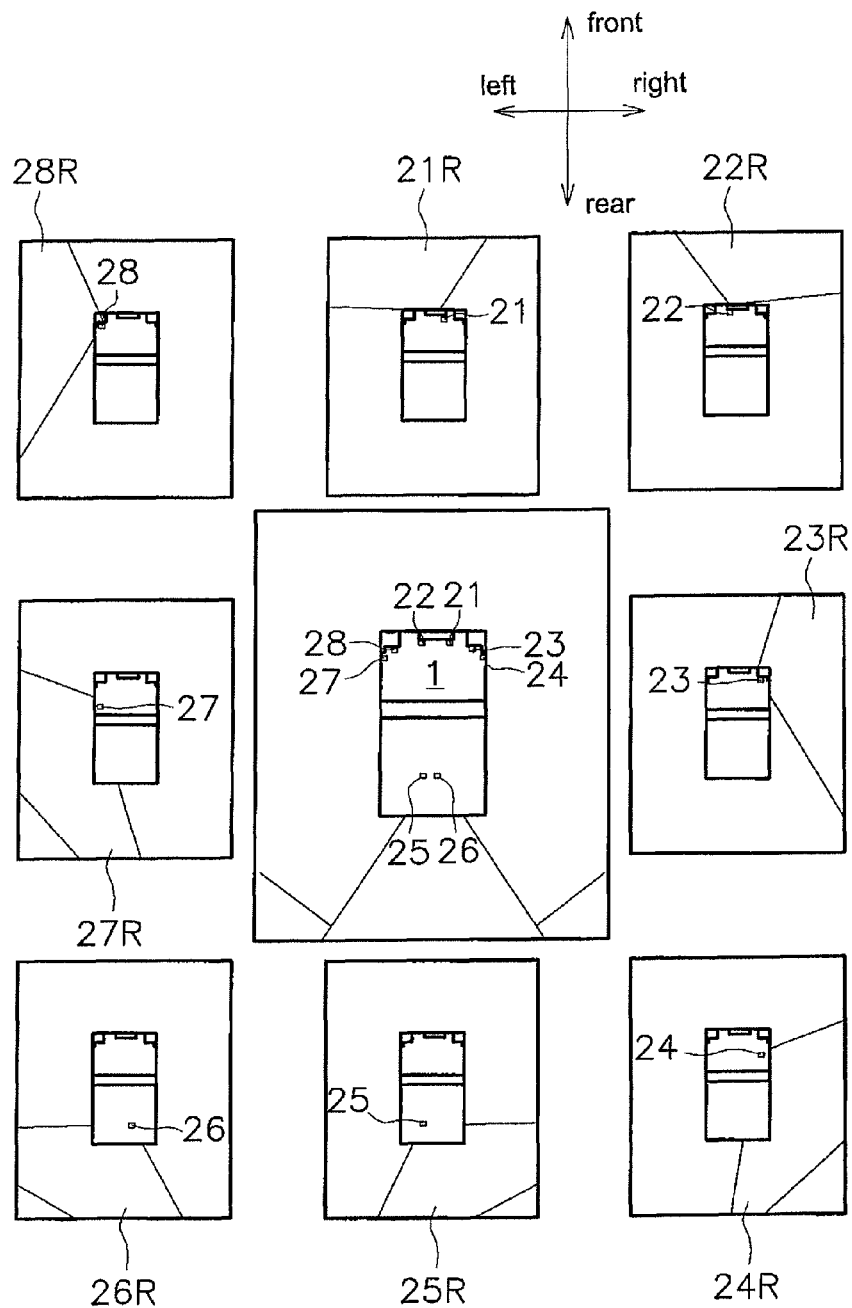
FIG. 13 is a plan view of the detection area detected by the plurality of radar devices in FIG. 12.
Figure 14:
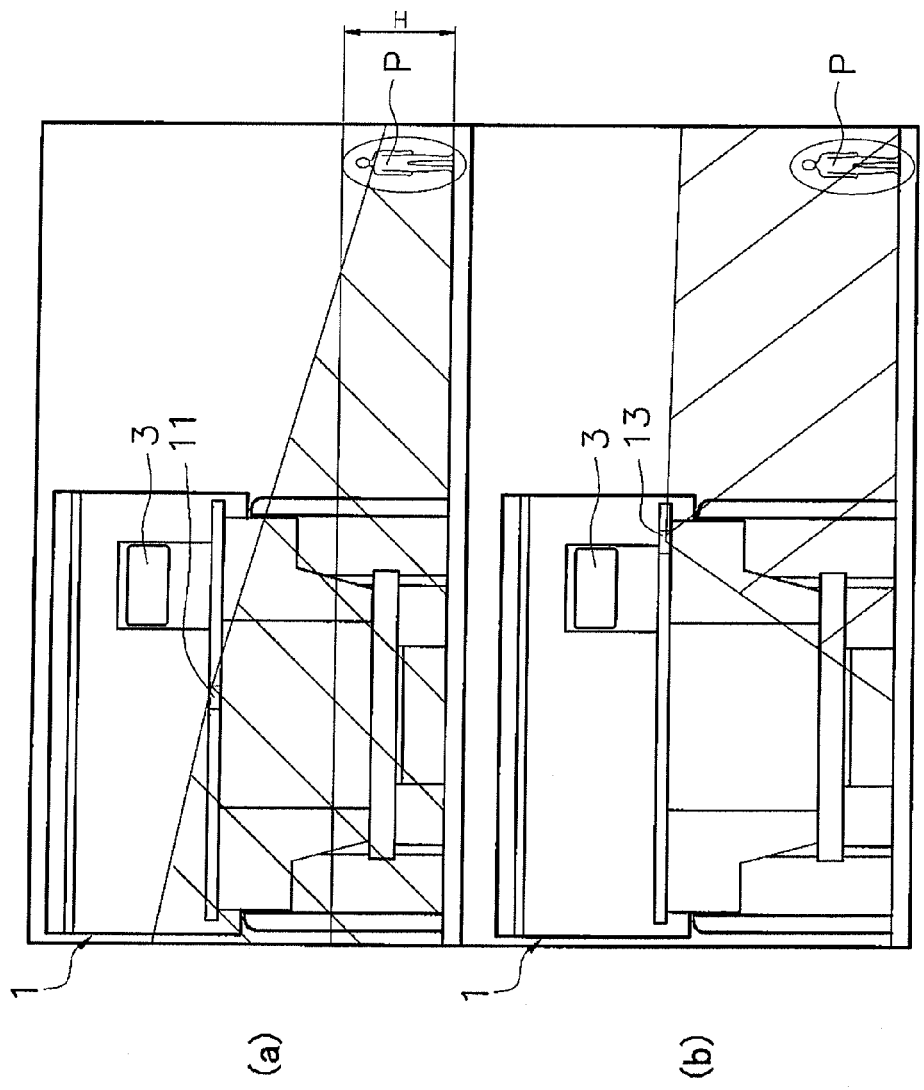
FIGS. 14a and 14b are diagrams of the capture range in the height direction of the front camera and the first left-side camera out of the plurality of cameras in FIG. 4.

As shown in FIG. 12, the first radar device 21 is disposed slightly to the right of center on the vehicle front face and on the lower deck 2A at a height of about 1 m from the ground. As shown in FIG. 13, the detection range of the first radar device 21 is a first detection range 21R that spreads out diagonally in the left-front direction from the front of the vehicle.

As shown in FIG. 12, the second radar device 22 is disposed adjacent to and on the left side of the first radar device 21 on the lower deck 2A. As shown in FIG. 13, the detection range of the second radar device 22 is a second detection range 22R that spreads out diagonally in the right-front direction from the front of the vehicle.

As shown in FIG. 12, the third radar device 23 is disposed near the front end of the right-side face of the lower deck 2A. As shown in FIG. 13, the detection range of the third radar device 23 is a third detection range 23R that spreads out to the right from the diagonal right-front direction of the vehicle.

As shown in FIG. 12, the fourth radar device 24 is disposed near the right-side end at an intermediate height position between the lower deck 2A and the upper deck 2B on both side faces of the vehicle. As shown in FIG. 13, the detection range of the fourth radar device 24 is a fourth detection range 24R that spreads out to the rear from the right of the vehicle.

As shown in FIG. 12, the fifth radar device 25 is disposed under the vessel 4, and as shown in FIG. 10, above the axle 6a that transmits rotational drive force to the left and right rear wheels 6. As shown in FIG. 13, the capture range of the fifth radar device 25 is a fifth capture range 25R that spreads out to the rear from the diagonal right-rear of the vehicle.

As shown in FIG. 12, the sixth radar device 26 is similar to the fifth radar device 25 in that it is disposed at a position above the axle 6a and adjacent on the right side of the fifth radar device 25. As shown in FIG. 13, the capture range of the sixth radar device 26 is a sixth capture range 26R that spreads out from the rear of the vehicle to the diagonal left-rear.

As shown in FIG. 12, the seventh radar device 27 is disposed at a position near the left end at an intermediate height position between the lower deck 2A and the upper deck 2B on both sides of the vehicle, that is, in left and right symmetry with the fourth radar device 24. As shown in FIG. 13, the capture range of the seventh radar device 27 is a seventh capture range 27R that spreads out from the rear of the vehicle to the left.

As shown in FIG. 12, the eighth radar device 28 is disposed at a position near the front end on the left-side face of the lower deck 2A, that is, in left and right symmetry with the third radar device 23. As shown in FIG. 13, the capture range of the eighth radar device 28 is an eighth capture range 28R that spreads out from the left of the vehicle in the diagonal front-left direction.

With the above-mentioned eight radar devices 21 to 28, as shown in the middle diagram of FIG. 13, the relative position of an obstacle with respect to the dump truck 1 can be detected using a detection range that encompasses the entire 360 degrees around the dump truck 1. Also, the eight radar devices 21 to 28 transmit relative position data indicating the relative position of the obstacle detected by the devices to the controller 100.

Monitor 50

The monitor 50 is disposed in front of the driver's seat inside the cab 3. The monitor 50 displays images such as the bird's-eye image 200 (discussed below; see FIG. 17a, etc.) under the control of the controller 100. An example of the display on the monitor 50 will be discussed below.

Controller 100

The controller 100 uses the above-mentioned six cameras 11 to 16 and eight radar devices 21 to 28 to display on the bird's-eye image 200 any obstacles that are in the periphery of the dump truck 1, monitors this display, and warns the driver of the presence of an obstacle as needed. As shown in FIG. 3, the controller 100 comprises a bird's-eye image combination section 110, a camera image switching and viewpoint conversion section 120, a display controller 130, a monitor image production section 140, an obstacle information collection section 210, and an obstacle processor 220.

As shown in FIG. 3, the bird's-eye image combination section 110 is connected to the six cameras 11 to 16, and receives image data over the capture ranges respectively acquired by the cameras 11 to 16. The bird's-eye image combination section 110 also combines the images corresponding to the received image data to produce a bird's-eye image 200 (see FIG. 17a, etc.) that includes the entire periphery of the dump truck 1. More specifically, the bird's-eye image combination section 110 subjects each set of image data to coordinate conversion to produce bird's-eye image data indicating the bird's-eye image 200 in which the plurality of images are projected onto a specific projection face.

As shown in FIG. 13, the camera image switching and viewpoint conversion section 120 is connected to the six cameras 11 to 16, and switches the captured images produced by the cameras 11 to 16 displayed on the screen of the monitor 50 along with the bird's-eye image 200 according to the obstacle detection result produced by the radar devices 21 to 28, etc. The camera image switching and viewpoint conversion section 120 also converts the captured images acquired from the cameras 11 to 16 into images from an overhead viewpoint of infinite distance.

As shown in FIG. 3, the display controller 130 is connected to the camera image switching and viewpoint conversion section 120, the monitor image production section 140, and the obstacle processor 220. The display controller 130 transmits obstacle position data for displaying a combination of the obstacle position information acquired from the radar devices 21 to 28 within the bird's-eye image 200 formed by combining the images acquired by the cameras 11 to 16, to the camera image switching and viewpoint conversion section 120 and the monitor image production section 140.

As shown in FIG. 3, the monitor image production section 140 is connected to the bird's-eye image combination section 110, the camera image switching and viewpoint conversion section 120, and the display controller 130. The monitor image production section 140 produces an image displayed on the monitor 50, including the position of any obstacles on the bird's-eye image 200, on the basis of obstacle position data and image data for the entire periphery of the dump truck 1 acquired by the six cameras 11 to 16 and the eight radar devices 21 to 28.

As shown in FIG. 3, the obstacle information collection section 210 is connected to the eight radar devices 21 to 28 and the obstacle processor 220. The obstacle information collection section 210 receives obstacle detection results for the detection regions of the eight radar devices 21 to 28, and transmits them to the obstacle processor 220.

As shown in FIG. 3, the obstacle processor 220 is connected to the obstacle information collection section 210 and the display controller 130, and transmits the obstacle position information received from the obstacle information collection section 210 to the display controller 130.

Capture Range of Cameras 11 to 16

As shown in FIG. 4, in this embodiment, the plurality of cameras 11 to 16 are disposed on the front and side faces of the upper deck 2B and at the rear end of the body frame 2, the images captured by the cameras 11 to 16 are combined, and the bird's-eye image 200 shown in FIG. 11 is displayed on the monitor 50.

As shown in FIG. 11, the bird's-eye image 200 is obtained by combining the images from the capture regions 11C to 16C captured by the cameras 11 to 16. Consequently, the driver can monitor the entire 360-degree periphery around the dump truck 1 merely by checking the bird's-eye image 200 displayed on the monitor 50.

The capture range in the planar direction of the cameras 11 to 16 will now be described.

With the dump truck 1 in this embodiment, the front camera 11, the left and right first side cameras 12 and 13 and the left and right second side cameras 14 and 15 are provided to the upper deck 2B, and the rear camera 16 is provided to the rear end of the body frame 2.

In particular, the left and right first side cameras 12 and 13 cover the capture range from the side to the left and right diagonal front directions of the body of the dump truck 1, while the left and right second side cameras 14 and 15 cover the capture range from the left and right sides of the body of the dump truck 1 to the diagonal rear direction.

Consequently, the captured images acquired from the front camera 11 and the rear camera 16 are combined to produce a bird's-eye image 200 that covers the entire periphery of the dump truck 1, allowing the periphery to be monitored.

Also, in this embodiment, as shown in FIG. 11, the mutually adjacent cameras 11 to 16 are installed so as to overlap at the portions where the capture regions 11C to 16C of the cameras 11 to 16 are adjacent to one another.

Consequently, the entire 360-degree periphery around the plane of the dump truck 1 can be monitored by providing connecting lines in the overlapping regions of the capture regions 11C to 16C of the cameras 11 to 16.

The connecting lines that connect mutually adjacent capture regions 11C to 16C on the bird's-eye image 200 can be set to any position within the overlapping regions of the capture regions 11C to 16C.

Next, the capture ranges in the height direction of the cameras 11 to 16 will be described.

Figure 15:
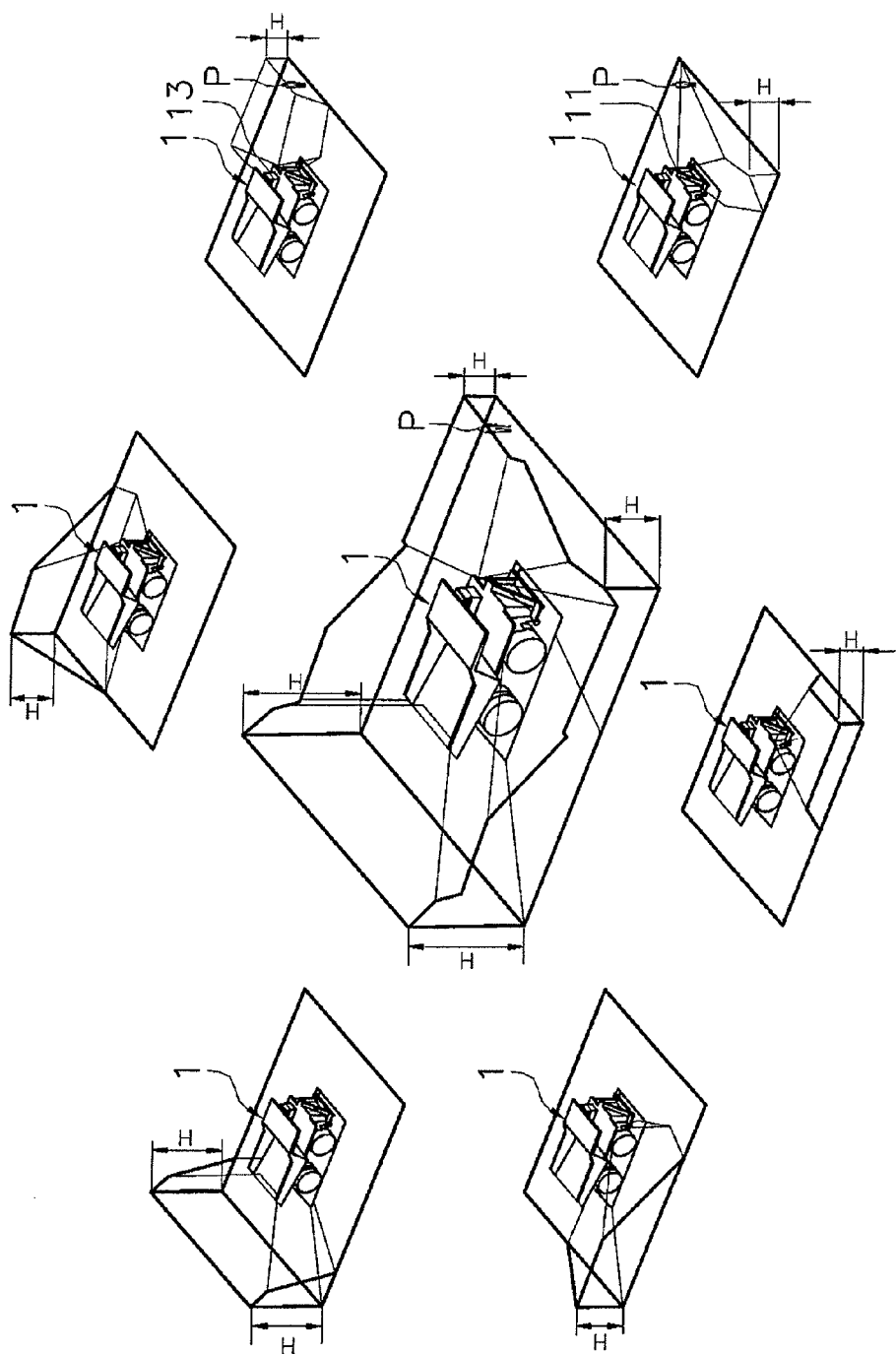
FIG. 15 are oblique views of the three-dimensional capture range of the plurality of cameras in FIG. 4.
Figure 16:
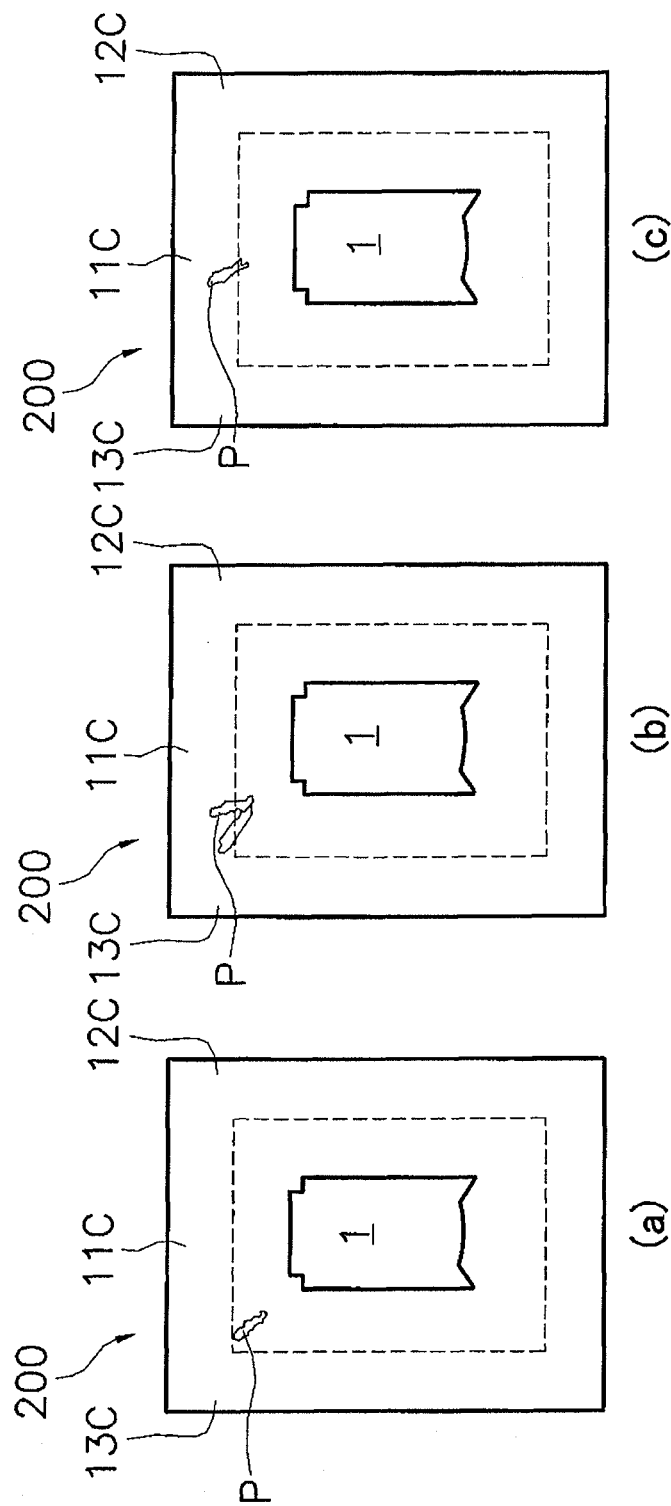
FIGS. 16a to 16c are diagrams showing how a person looks in a bird's-eye image when the person moves around the periphery of the body of the dump truck in FIG. 1.

FIG. 15 shows the three-dimensional capture ranges of the cameras 11 to 16 all the way around the dump truck 1. Here, the capture ranges in the height direction of the cameras 11 to 16 are shown within a 10-meter range around the dump truck 1.

As shown in FIG. 14a, for example, the cameras 11 to 16 may be disposed so that part of the body of a person P is included within the capture range of the front camera 11 indicated by hatching, so that an obstacle (person) present near the dump truck 1 (such as within a range of 10 m from the vehicle body) will be reliably displayed on the bird's-eye image 200.

However, if a person P is present near the capture region periphery to the front of the vehicle in FIG. 15, then in the state shown in FIG. 14a the head of the person P will end up being outside the capture range of the front camera 11, so only the part from the shoulders down of the person P will be displayed on the bird's-eye image 200 in the image captured by the front camera 11. In this case, since only part of the person P (in the height direction) is displayed, there is the risk that the driver looking at the bird's-eye image 200 will not recognize the person P as a person.

In view of this, with the dump truck 1 in this embodiment, the cameras 11 to 16 are disposed so as to have a field range of at least one-half the height (more specifically, at least 2 m) of the upper deck 2B (approximately 4 m or more) so that the entire body of the person (obstacle) present near the dump truck 1 can be displayed in the bird's-eye image 200.

Specifically, with a large vehicle such as the dump truck 1, it is difficult for the driver in the cab 3 to see a person or other such obstacle that is lower than the upper deck 2B on which the cab 3 is installed. Thus, it is important for any obstacle located lower than the upper deck 2B to be reliably detected from the ground all the way around the dump truck 1 so that any person or other obstacle present around the dump truck 1 can be confirmed by means of the periphery monitoring device 10.

With the dump truck 1 in this embodiment, out of the capture range of the front camera 11 and the capture range of the adjacent first left-side camera 13, as shown in FIG. 14a, if the capture range of the front camera 11 is lower than a specific height H (2 m) within a range of 10 m around the dump truck 1, then as shown in FIG. 14b, the front camera 11 and the first left-side camera 13 are positioned so that the capture range of the first left-side camera 13 will be higher than the specific height H (2 m).

In this embodiment, as discussed above, the minimum height H in the capture ranges of adjacent cameras is designed to be at least 2 m, which includes the entire body of a person P.

Consequently, since the capture range in the height direction of one of two adjacent cameras is designed to be at least the height H (2 m) that is at least one-half the height of the upper deck 2B, an obstacle that is located lower than the upper deck 2B will be within the capture range of one of the adjacent cameras 11 to 16, and the entire body of the person P can be reliably displayed in the bird's-eye image 200.

More specifically, as shown in FIGS. 16a to 16c, even if the person P moves so as to straddle a boundary portion between the capture ranges of the cameras 11 to 16 (from the capture range 13c to the capture range 11c), the entire body of the person P can still be displayed on the bird's-eye image 200.

When the various captured images are combined to produce the bird's-eye image 200, it is preferable to use an alpha blending technique in which overlapping portions of the images are averaged and displayed for the boundary portions of the captured images. As a result, even if the person P moves so as to straddle a boundary portion of the captured images, the person P will not disappear at the boundary portion in the bird's-eye image 200.

OTHER EMBODIMENTS

An embodiment of the present invention was described above, but the present invention is not limited to the above embodiment, and various modifications are possible without departing from the gist of the invention.

(A) In the above embodiment, an example was described in which the cameras 11 to 16 and the radar devices 21 to 28 were laid out as discussed above, but the present invention is not limited to this.

There are no particular restrictions on the layout of the cameras and radar devices so long as the layout allows the entire periphery of the dump truck to be covered.

However, when a camera or the like is attached to a member that may be replaced in the customization of the vehicle, such as the vessel 4, then it is preferable, in that positioning of the camera, etc., will need to be performed every time that member is replaced, to attach the camera or radar device somewhere other than on the vessel or other such replaceable part.

(B) In the above embodiment, an example was described in which the first right-side camera 12 and the second right-side camera 14 were provided to the right side of the vehicle, and the first left-side camera 13 and the second left-side camera 15 were provided to the left side of the vehicle, as side cameras, but the present invention is not limited to this.

For example, the configuration may be such that cameras with a larger field angle are used, so that the left or right side of the vehicle can be covered with a single camera, and one camera is provided on the left side and one on the right.

(C) In the above embodiment, an example was described in which the cameras 11 to 16 were disposed so that a height (approximately 2 m or more) of at least one-half the height of the upper deck 2B would be within the capture range in order for the entire body of a person present near the dump truck 1 to be reliably displayed on the bird's-eye image 200, but the present invention is not limited to this.

For example, if we assume the obstacle to be reliably detected is something other than a person, the field range in the height direction may be set according to the height of obstacles present in the periphery of the dump truck at the work site, etc.

The dump truck of the illustrated embodiments has the effect that it is possible to perform periphery monitoring with no dead angles by optimizing the layout of a plurality of cameras while taking into account limitations such as the shape of the dump truck. Therefore, the structures of the illustrated embodiments can be widely applied to various kinds of work vehicle that require periphery monitoring around the vehicle.

The invention claimed is:

1. A dump truck comprising:
 a body including an upper deck where a driver's seat is disposed and a main frame disposed in a longitudinal direction of the dump truck; and
 a plurality of cameras each configured to capture an image in a three dimensional capture range, the cameras being arranged to obtain images to be combined to generate a bird's-eye image to monitor a periphery of the dump truck, the cameras including
 a front camera disposed at the front of the upper deck to obtain an image of an area in front of the body,
 a rear camera disposed at a rear end of the main frame to obtain an image of an area in rear of the body, and
 a plurality of side cameras respectively provided on left and right sides of the upper deck to obtain images of an area between diagonally to the front and diagonally to the rear of the body
 the front camera, the rear camera, and the side cameras are arranged on the body such that the capture ranges of adjacent cameras among the front, rear, and side cameras overlap, and such that for any one camera among the front, rear, and side cameras whose capture range has a height dimension smaller than one-half a height of the upper deck at a prescribed portion of the periphery, there is another camera among the front, rear, and side cameras that is adjacent to the one camera and whose capture range has a height dimension of at least one-half the height of the upper deck at the prescribed portion of the periphery.

2. The dump truck according to claim 1, wherein
the side cameras include a first camera configured and arranged to obtain an image of an area diagonally to the front of the body, and a second camera configured and arranged to obtain an image of an area diagonally to the rear of the body.

3. The dump truck according to claim 1, further comprising a plurality of radars that are provided to the body to detect objects present in the periphery of the body.

4. The dump truck according to claim 3, wherein
the radars are provided at positions lower than those of the cameras on the body.

5. The dump truck according to claim 3, wherein
the radars are provided between the upper deck and a lower deck, which constitute part of the body, or on the lower deck.

6. The dump truck according to claim 3, wherein
the radars are ultra-wideband radars.

7. The dump truck according to claim 1, wherein
the height of the upper deck is at least 4 meters from a ground in the periphery of the dump truck.

* * * * *